(12) United States Patent
Kim et al.

(10) Patent No.: US 7,734,304 B2
(45) Date of Patent: *Jun. 8, 2010

(54) METHOD OF UPDATING CHANNEL INFORMATION BY A MOBILE STATION THAT IS IN POWER SAVING MODE

(75) Inventors: Beom Joon Kim, Seoul (KR); Ki Seon Ryu, Seoul (KR); Yong Ho Kim, Bucheon-si (KR); Yong Won Kwak, Anyang-si (KR); Ki Hyoung Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/413,400

(22) Filed: Mar. 27, 2009

(65) Prior Publication Data

US 2009/0197601 A1 Aug. 6, 2009

Related U.S. Application Data (63) Continuation of application No. 11/325,871, filed on Dec. 30, 2005, now Pat. No. 7,630,740.

(30) Foreign Application Priority Data

| Dec. 30, 2004 | (KR) | .................. 10-2004-0117275 |
| Mar. 9, 2005 | (KR) | .................. 10-2005-0019841 |
| Dec. 27, 2005 | (KR) | .................. 10-2005-0131043 |

(51) Int. Cl.
*H04B 7/00* (2006.01)
*H04Q 7/20* (2006.01)

(52) U.S. Cl. .................. 455/515; 455/574; 455/434; 455/458

(58) Field of Classification Search .................. 455/574, 455/572, 343.1–343.5, 509, 452.1, 450, 522, 455/458, 515, 517, 67.11, 434; 370/335, 370/331, 328, 477
See application file for complete search history.

(56) References Cited

U.S. PATENT DOCUMENTS

| 4,009,347 | A | | 2/1977 | Flemming et al. |
| 4,903,321 | A | | 2/1990 | Hall et al. |
| 5,148,148 | A | | 9/1992 | Shima et al. |
| 6,111,865 | A | * | 8/2000 | Butler et al. ............... 370/335 |
| 6,230,026 | B1 | | 5/2001 | Schwaller et al. |

(Continued)

FOREIGN PATENT DOCUMENTS

EP 1471761 A2 10/2004

(Continued)

*Primary Examiner*—John Lee
(74) *Attorney, Agent, or Firm*—Lee, Hong, Degerman, Kang & Waimey (57) ABSTRACT

A method of updating channel information by a mobile station (MS) that is in power saving mode is disclosed. More specifically, the method includes the MS which receives status information of a first channel descriptor and transmission frame information which includes when the first channel descriptor is to be transmitted. Furthermore, the MS compares status information of the first channel descriptor with status information of a second channel descriptor. Here, the second channel descriptor is stored in the MS. Lastly, if the compared status information are different, the MS receives the first channel descriptor according to the transmission frame information.

20 Claims, 5 Drawing Sheets

U.S. PATENT DOCUMENTS

| | | |
|---|---|---|
| 6,389,474 B1 | 5/2002 | Chien et al. |
| 6,631,116 B1 | 10/2003 | Eneroth et al. |
| 6,889,055 B1 | 5/2005 | Neufeld |
| 6,952,408 B2 | 10/2005 | Schwaller et al. |
| 6,980,820 B2 | 12/2005 | Sinnarajah et al. |
| 7,403,793 B2 | 7/2008 | Mauney et al. |
| 7,415,283 B2 | 8/2008 | Sinnarajah et al. |
| 7,522,941 B2 | 4/2009 | Lu |
| 7,630,729 B2 | 12/2009 | Kim et al. |
| 7,630,740 B2 | 12/2009 | Kim et al. |
| 2003/0114177 A1 | 6/2003 | Sinnarajah et al. |
| 2003/0174674 A1 | 9/2003 | Lee et al. |
| 2004/0179492 A1 | 9/2004 | Zhang et al. |
| 2005/0197125 A1 | 9/2005 | Kang et al. |
| 2006/0014550 A1 | 1/2006 | Ryu et al. |
| 2006/0029011 A1* | 2/2006 | Etemad et al. .............. 370/311 |
| 2006/0194598 A1 | 8/2006 | Kim et al. |
| 2007/0168577 A1 | 7/2007 | Kim et al. |
| 2008/0161022 A1* | 7/2008 | Patel et al. .................. 455/458 |
| 2009/0191908 A1 | 7/2009 | Kim et al. |
| 2009/0191909 A1 | 7/2009 | Kim et al. |
| 2009/0197599 A1 | 8/2009 | Cho et al. |
| 2009/0197601 A1 | 8/2009 | Kim et al. |

FOREIGN PATENT DOCUMENTS

| | | |
|---|---|---|
| EP | 1489863 A2 | 12/2004 |
| EP | 1571785 A2 | 9/2005 |
| JP | 2004247801 A | 9/2004 |
| KR | 1020030074026 A | 9/2003 |
| KR | 1020060013972 A | 2/2006 |

* cited by examiner

METHOD OF UPDATING CHANNEL INFORMATION BY A MOBILE STATION THAT IS IN POWER SAVING MODE

This application is a continuation of U.S. application Ser. No. 11/325,871, filed Dec. 30, 2005, now U.S. Pat. No. 7,630,740, issued on Dec. 8, 2009, which claims the benefit of Korean Application Nos. 10-2004-0117275 filed on Dec. 30, 2004, 10-2005-0019841 filed on Mar. 9, 2005, and 10-2005-0131043 filed on December 27, 2005, which are hereby incorporated by reference.

BACKGROUND OF THE INVENTION

1. Field of the Invention

The present invention relates to a method of updating channel information, and more particularly, to a method of updating channel information by a mobile station that is in power saving mode.

2. Discussion of the Related Art

In a Broadband Wireless Access System, an operation of a power saving mode is as follows. A paging zone refers to all the paging areas covered by a plurality of base stations. Here, all the base stations in the same paging zone share a same paging cycle (i.e., Paging_Cycle) and a same paging offset (i.e., Paging_Offset).

In the system, a mobile station (MS) can request to enter a power saving mode from the base station (BS). The BS can then permit the MS to enter the power saving mode by transmitting its paging group identification (i.e., Paging_Group_ID) and the paging cycle and the paging offset, both corresponding to the paging group ID. Upon receiving the paging group ID, the corresponding paging cycle, and the corresponding paging offset, the MS can then enter the power saving mode.

During the power saving mode, the MS receives a broadcast message in a form of a paging broadcast message (i.e., MOB-PAG-ADV) from the BS at specified paging cycle. From the paging broadcast message, the MS can determine whether to maintain or terminate the power saving mode.

If a situation arises where the MS has to send uplink traffic to the BS, the MS can terminate the power saving mode anytime. Conversely, if a situation arises where the MS, which is in the power saving mode, has to receive downlink traffic from the BS, the BS sends the paging broadcast message to instruct the MS to terminate the power saving mode.

Alternatively, if the MS, which is in a power saving mode fails to receive the paging broadcast message at the specified time as a result of moving to another paging zone or by failure to synchronize, then the MS has to terminate the power saving mode.

SUMMARY OF THE INVENTION

Accordingly, the present invention is directed to a method of updating channel information by a mobile station that is in power saving mode that substantially obviates one or more problems due to limitations and disadvantages of the related art.

An object of the present invention is to provide a method of updating channel information by a mobile station that is in power saving mode.

Another object of the present invention is to provide a method of providing channel information by a base station to a mobile station that is in power saving mode.

A further object of the present invention is to provide an apparatus for updating channel information by a mobile station that is in power saving mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of updating channel information by a mobile station (MS) that is in power saving mode includes the MS which receives status information of a first channel descriptor and a transmission frame information which includes when the first channel descriptor is to be transmitted. Furthermore, the MS compares status information of the first channel descriptor with status information of a second channel descriptor. Here, the second channel descriptor is stored in the MS. Lastly, if the compared status information are different, the MS receives the first channel descriptor according to the transmission frame information.

In another aspect of the present invention, a method of providing channel information by a base station (BS) to a mobile station (MS) that is in power saving mode, includes the BS which transmits status information of a first channel descriptor and transmission frame information which includes when the first channel descriptor is to be transmitted. Moreover, the BS transmits the first channel descriptor according to the transmission frame information.

Yet, in another aspect of the present invention, an apparatus for updating channel information by a mobile station (MS) that is in power saving mode includes a receiver for receiving status information of a first channel descriptor and a transmission frame information which includes when the first channel descriptor is to be transmitted. In addition, the apparatus includes a comparator for comparing status information of the first channel descriptor with status information of a second channel descriptor. Here, the second channel descriptor is stored in a memory of the MS. Lastly, the apparatus includes the receiver for receiving the first channel descriptor according to the transmission frame information, if the compared status information from the comparator are different.

Another aspect of the present invention includes a method of updating channel information by a mobile station (MS) that is in power saving mode. In the method, the MS receives status information of a channel descriptor and a transmission frame information which includes when the channel descriptor is to be transmitted. Furthermore, the MS recognizes a change in the status information of the channel descriptor since a last decoded status information. Lastly, the MS receives the channel descriptor according to the transmission frame information.

In another aspect of the present invention, a method of updating channel information by a mobile station (MS) that is in power saving mode includes the MS which receives a transmission frame information which includes a specified frame at which a channel descriptor is to be transmitted. Moreover, the MS recognizes the specified frame for receiving the channel descriptor which contains information different from channel descriptor information stored in the MS. Lastly, the MS receives the channel descriptor at the specified frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In connection with the present invention, a more detailed description of a power saving mode as well as a Downlink Channel Descriptor (DCD) and an Uplink Channel Descriptor (UCD) is provided in an IEEE 802.16e specification document.

As described above, the MS in a power saving mode receives a paging broadcast message (i.e., MOB_PA-G_ADV), which is transmitted according to a paging cycle, from the BS in the paging zone. Here, the power saving mode can be an idle mode or a sleep mode.

Table 1 represents an example of a Paging-Group-Action message for forming a paging zone. Here, the base stations can transmit messages between each other via a wired connection (e.g., a cable).

TABLE 1

| Field | Size | Notes |
|---|---|---|
| Paging-group-action Message Format( ){ | | |
| Message Type | 8 bits | |
| Sender BS-ID | 48 bits | Base station unique identifier(Same number as that broadcasted on the DL-MAP message) |
| Target BS-ID | 48 bits | Base station unique identifier(Same number as that broadcasted on the DL-MPA message) |
| Time Stamp | 32 bits | Number of millisecond since midnight GMT (set to 0xffffffff on the DL-MAP message) |
| Action | 4 bits | 0 - Assign target BS to paging group<br>1 - Remove target BS from paging group<br>2 - Query (to which paging group target BS belongs?)<br>3 - Information (to which paging group sender BS belongs?) |
| Num Record | 4 bits | Number of paging group-ID records |
| For(j=0; j<Num Record; j++){ | | |
| Paging-group-ID | 16 bits | Paging-group-ID |
| PAGING_CYCLE | 16 bits | Cycle in which the paging message in transmitted within the paging group |
| PAGING_OFFSET | 8 bits | MSS PAGING OFFSET parameter |
| } | | |
| Security field | TBD | A mean to authenticate this message |
| CRC field | 32 bits | IEEE CRC-32 |
| } | | |

The messages transmitted between the base stations can be used for following four purposes based on the indication of action bits. That is, if an action field indicates that Action=0, then the message can include a command to assign a target BS to a specified paging group. Here, the target BS is the BS that receives the message from another BS. On the contrary, if the action field indicates that Action=1, then the message can include a command to remove or exclude the target BS from a specified paging group. Furthermore, if the action field indicates that Action=2, then the message can include a query as to which paging group the target BS belongs. Lastly, if the action field indicates that Action=3, then the message can include information as to which paging group a sender BS belongs. Here, the sender BS is the BS that transmits the message from another BS.

Because one BS can belong to more than one paging group, a paging-group-action message can include information on a plurality of paging groups. In addition, the base stations can gain access to the paging cycle and the paging offset of each paging zone from the paging-group-action, which is shared by base stations.

Table 2 is an example of a deregistration request message (i.e., DREG_REQ), which is a message by the MS to request to enter a power saving mode.

TABLE 2

| Syntax | Size | Notes |
|---|---|---|
| DREG-REQ_Message_Format( ){ | | |
|   Management Message Type=29 | 8 bits | 0x00=SS de-registration request from BS and network |
| | | 0x01=request for MS deregistration from Serving BS invitation of MS paging Availability Mode |
| | | 0x02-0xFF=reserved |
|   De-registration Request Code | 8 bits | Only valid if De-Registration Request Code=0x01 |

TABLE 2-continued

| Syntax | Size | Notes |
|---|---|---|
|   Paging Cycle Request | 16 bits | |
|   TLV encoded parameter | variable | |
| } | | |

According to Table 2, the MS can set a De-Registration Request Code of the DREG_REQ message to '0x01,' and request for deregistration from a serving BS. That is, the MS requests the BS for permission to enter a power saving mode. Here, the serving BS refers to the BS which sends paging information to mobile stations in its coverage area. In addition, the MS can send its preferred paging cycle in the DREG_REQ message.

Table 3 is an example of a deregistration command message (i.e., DREG_CMD).

TABLE 3

| Syntax | Size | Notes |
|---|---|---|
| DREG-REQ_Message_Format( ){ | | |
|   Management Message Type=29 | 8 bits | |
|   Action Code | 8 bits | |
|   TLV encoded parameter | variable | |
| } | | |

Using an 'Action Code' of the DREG_CMD message, the BS can permit the MS to enter a power saving mode (e.g., Action Code=0x05), have the MS request again the request to enter a power saving mode (e.g., Action Code=0x06), or have the MS wait (or cease the requests to enter the power saving mode) until the BS transmits the DREG_CMD message (e.g., Action Code=0x07).

Table 4 is an example of action codes of a deregistration command (i.e., DREG_CMD) message.

TABLE 4

| Action Code | Action |
|---|---|
| 0x00 | SS shall leave the current channel and attempt to access another channel |
| 0x01 | SS shall listen to the current channel but shall not transmit until an RES-CMD message or DREG_CMD with Action Code 0x00 is received |
| 0x02 | SS shall listen to the current channel but only transmit on the Basic, Primary Management and Secondary Management Connections. |
| 0x03 | SS shall return to normal operation and may transmit on any of its active connections. |
| 0x04 | SS shall terminate current Normal Operation with the BS; the BS shall transmit this action code only in response to any SS DREG-REQ |
| 0x05 | required MSS de-registration from Serving BS and request initiation of MSS Idle Mode |
| 0x06 | The MSS may retransmit the DREG-REQ message after the time duration (REQ-duration) given by |
| 0x07 | The MSS shall not retransmit the DREG-REQ message and shall wait the DREG_CMD message |
| 0x08-0xFF | Reserved |

By using a type-length-field (TLV) parameters, which can be selectively included in the DREG_CMD message, a paging group ID, a paging cycle, and a paging offset can be transmitted to the MS. The paging group ID, the paging cycle, and the paging offset must be kept (unchanged) while the corresponding MS is in the power saving mode. After the MS enters the power saving mode, the MS receives a paging broadcast (i.e., MOB-PAG-ADV) message at specified paging cycle(s) and at specified paging offset. Based on the paging broadcast message, the MS can remain in or terminate the power saving mode.

Table 5 represents an example of a paging broadcast (i.e., MOB-PAG-ADV) message.

TABLE 5

| Syntax | Size | Notes |
|---|---|---|
| MOB_PAG-ADV_Message_Format( ){ | | |
|   Management Message Type =62 | 8 bits | |

TABLE 5-continued

| Syntax | Size | Notes |
|---|---|---|
| Num_Paging Group IDs | 8 bits | Number of Paging Group IDs in this message |
| For(i=0; i<Num_Paging_Group_IDs; i++){ | | |
|   Paging Group ID | 8 bits | |
| } | | |
| For(j=0; j<Num_MACs; j++){ | | Number of MSS MAC Addresses in message can be determined from the length of the message(found in the generic |
|   MSS MAC Address hash | 24 bits | |
|   Action Code | 2 bits | Paging action instruction to MSS<br>00=No Action Required<br>01=Performing Ranging to establish location and acknowledge message<br>10=Enter Network<br>11=reserved |
|   Reserved | 6 bits | |
| } | | |

In the Broadband Wireless Access System, the MS has to receive a Downlink Channel Descriptor/Uplink Channel Descriptor (DCD/UCD) for network entry when the MS turns on power and for network re-entry in performing operations such as handover.

Table 6 is an example of a Downlink Channel Descriptor (DCD).

TABLE 6

| Syntax | Size | Notes |
|---|---|---|
| DCD_Manage_Format( ){ | | |
|   Management Message Type=1 | 8 bits | |
|   Downlink Channel ID | 8 bits | |
|   Configuration Change Count | 8 bits | |
|   TLV Encoded information for the overall channel | variable | TLV specific |
|   Begin PHY Specification Section{ | | |
|     for(i=1; i<=n; i++){ | | For each downlink burst profile 1 to n |
|       Downlink_Burst_Profile | | PHY specific |
|     } | | |
|   } | | |
| } | | |

Table 7 is an example of an Uplink Channel Descriptor (UCD).

TABLE 7

| Syntax | Size | Notes |
|---|---|---|
| UCD_Manage_Format( ){ | | |
|   Management Message Type=0 | 8 bits | |
|   Configuration Change Count | 8 bits | |
|   Ranging Backoff Start | 8 bits | |

TABLE 7-continued

| Syntax | Size | Notes |
|---|---|---|
|   Ranging Backoff End | | |
|   Ranging Backoff Start | | |
|   Ranging Backoff End | | |
|   TLV Encoded information for the overall channel | variable | TLV specific |
|   Begin PHY Specification Section{ | | |
|     for(i=1; i<=n; i++){ | | For each downlink burst profile 1 to n |
|       Uplink_Burst_Profile | | PHY specific |
|     } | | |
|   } | | |
| } | | |

The DCD/UCD messages are physical layers parameters which apply to each allocated burst intervals for downlink and uplink. Moreover, the DCD/UCD messages include information on a modulation scheme and a Forward Error Correction (FEC) code type. Furthermore, using the DCD/UCD messages, necessary parameters (e.g., K and R values of a RS code) are provided according to various FEC code types. These types of parameters can be provided via Burst Profile. Here, the Burst Profile is provided for each Uplink Interval Usage Code (UIUC) and Downlink Interval Usage Code (DIUC) from the UCD and the DCD.

The status information or the parameters and setting that can be included in the DCD/UCD messages can vary depending on the physical layers. As such, the parameters or settings provided in Tables 8 and 9 can be included in a 'TLV Encoded Information for the overall channel' field of each message.

Table 8 is an example of parameters included in a 'TLV Encoded Information for the overall channel' field of the DCD message in an Orthogonal Frequency Division Multiple Access (OFDMA).

TABLE 8

| Name | Type (byte) | Length | Value (variable length) | PHY scope |
|---|---|---|---|---|
| Downlink_Burst_Profile | 1 | | May appear more once. The length is the number of bytes in the overall object, including embedded TLV items | All |
| BS EIRPS | 2 | 2 | Signed in units of 1 dBM | All |
| Frame Duration | 3 | 4 | The number of PSs contained in a Burst FDD or TDD frame. Required only for frame downlinks | SC |
| PHY Type | 4 | 1 | The PHY Type to be used | SC |
| Power adjustment rule | 5 | 1 | 0 = Preserve Peak Power 1 = Preserve Mean Power Describe the power adjustment rule when performing a transition from one burst profile to another. | SC, SCa |
| Channel Number | 6 | 1 | Downlink channel number as defined in 8.5. Used for license-exempt operation only. | SCa, OFDM, OFDMA |
| TTG | 7 | 1 | TTG (in PSs) | SCa, OFDM, OFDMA |
| RTG | 8 | 1 | RTG (in PSs) | SCa, OFDM, OFDMA |
| $RSS_{IR\_max}$ | 9 | 2 | Initial Ranging Max. Received Signal Strength at BS Signal in units of 1 dBm | All |
| Channel Switch Frame Number | 10 | 3 | Channel switch frame number as defined in 6. 3. 15. 7, Used for lisense-exempt operation only | SCa, OFDM, OFDMA |
| Frequency | 12 | 4 | Downlink center frequency(kHz) | All |
| BS ID | 13 | 6 | Base Station ID | SCa, OFDM, OFDMA |
| Frame Duration Code | 14 | 1 | The duration of the frame. The frame duration code values are specified in Table 230. | OFDM |
| Frame Number | 15 | 3 | The number of the frame containing the DCD message. | OFDM |

Table 9 is an example of settings or parameters included in a 'TLV Encoded Information for the overall channel' field of the UCD message in an Orthogonal Frequency Division Multiple Access (OFDMA).

TABLE 9

| Name | Type (byte) | Length | Value |
|---|---|---|---|
| Initial ranging codes | 150 | 1 | Number of initial ranging CDMA codes. Possible values are 0-225. |
| Periodic ranging codes | 151 | 1 | Number of periodic ranging CDMA codes. Possible values are 0-225. |
| Bandwidth request codes | 152 | 1 | Number of bandwidth request codes. Possible values are 0-225. |
| Periodic ranging backoff start | 153 | 1 | Initial backoff window size for periodic ranging contention, expressed as a power of 2. Range:0-15 (the highest order bits shall be unused and set to 0). |
| Periodic ranging backoff end | 154 | 1 | Final backoff window size for periodic ranging contention, expressed as a power of 2. (the highest order bits shall be unused and set to 0). |
| Start of ranging codes group | 155 | 1 | Indicates the starting number, S, of the group of codes used for this uplink. All the ranging codes used on this uplink will be between S and ((S + N + M + L)mod256). Where, N is the number of initial-ranging codes M is the number of periodic-ranging codes L is the number of bandwidth-request codes The range of value is $0 \leq S \leq 255$ |
| Permutation base | 156 | 1 | Determine the UL_IDcell parameter for the subcarrier permutation to be used on this uplink channel. |

TABLE 9-continued

| Name | Type (byte) | Length | Value |
|---|---|---|---|
| UL allocated sub-channels bitmap | 157 | 9 | This is a bitmap describing the sub-channels allocated to the segment in the UL, when using uplink PUSC permutation. The LSB of the first byte shall correspond to subchannel 0. For amy bit that is not set, the corresponding subchannel shall not be used by the SS on that segment. |

In the system, the DCD/UCD messages are not limited to settings or parameters contained in Tables 8 and 9. In other words, the DCD/UCD messages can include other information besides the information listed in Tables 8 and 9.

As shown in Table 6-Table 9, the DCD/UCD message contains large volumes of information. As such, it would be inefficient for the MS to decode every DCD/UCD messages received. Furthermore, the DCD/UCD message of Tables 6 and 7 includes Configuration Change Count parameter. Here, the Configuration Change Counter can increase by increments of one (1) if the value(s) contained in the current DCD/UCD message is (are) different from the value(s) contained in a previous DCD/UCD message. In other words, if the MS recognizes that there is change in status information of a received DCD/UCD from status information of the DCD/UCD stored in the MS, then the Configuration Change Counter increases by a specified increment. The settings or parameters can also be referred to as status information.

As discussed above, lengths of the DCD/UCD messages are not only long but information contained in the DCD/UCD messages are relatively constant. That is, the DCD/UCD messages generally do not change often. Therefore, the DCD/UCD messages are not transmitted in every frame, and more realistically, the DCD/UCD messages are transmitted periodically with a maximum period of 10 seconds, for example.

As for the BS, the BS transmits the DCD/UCD message containing a new status information (or new values) after waiting a specified time period so that all mobile stations in its cell coverage area can receive the DCD/UCD message. Here, the Configuration Change Counter included in the DCD/UCD message increases by an increment of 1). Thereafter, the BS applies the updated or changed status information of the DCD/UCD to the burst profile of the uplink/downlink frame(s).

As shown in Table 10 and Table 11, the updated status information can be provided to the MS by using a DL-MAP message and a 'DCD/UCD Count' field included in an UL-MAP message. Since the DL-MAP message and the UL-MAP message are encoded with predefined values of the physical layer, the MS can decode the changed status information in the DCD message and the UCD message.

Table 10 is an example of a DL-MAP.

TABLE 10

| Syntax | Size | Notes |
|---|---|---|
| DL-MAP__Message__Format( ){ | | |
| Management Message Type=2 | 8 bits | |
| PHY Synchronization Field | variable | See appropriate PHY specification |
| DCD Count | 8 bits | |
| Base Station ID | 48 bits | |
| Begin PHY Specific Section { for(i=1; j<=n; i++){ | | See applicable PHY section For each DL-MAP element 1 to n |

TABLE 10-continued

| Syntax | Size | Notes |
|---|---|---|
| DL-MAP__IE( ) | variable | See corresponding PHY specification |
| } } } if!(byte boundary){ | | |
| Padding Nibble | 4 bits | Padding to reach byte boundary |
| } } | | |

Table 11 is an example of an UL-MAP.

TABLE 11

| Syntax | Size | Notes |
|---|---|---|
| UL-MAP__Message__Format( ){ | | |
| Management Message Type=3 | 8 bits | |
| Uplink Channel ID | 8 bits | |
| UCD Count | 8 bits | |
| Allocation Start Time | 32 bits | |
| Begin PHY Specific Section{ for(i=1, i<=n, i++) { | | See applicable PHY section For each US-MAP element 1 to n |
| UL-MAP__IE( ) | variable | See corresponding PHY specification |
| } | | Padding to reach byte boundary |
| } if!(byte boundary){ Padding Nibble } } | | |

After the MS receives an updated DL-MAP/UL-MAP having status information different from that of the previous status information, the MS uses the status information (or values) included in the last received DCD/UCD message to decode the bursts included in the corresponding DL-MAP/UL-MAP.

Figure 1:
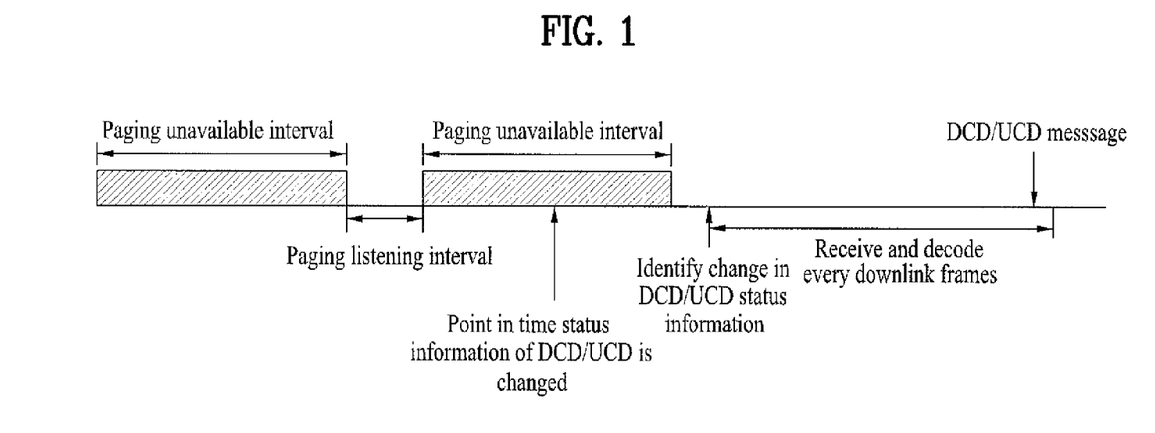
FIG. 1 is a diagram illustrating an example of an operation of a power saving mode according to updated status information of a DCD/UCD.

FIG. 1 is a diagram illustrating an example of an operation of a power saving mode according to updated status information of a DCD/UCD.

If the paging broadcast message is configured to be transmitted using a predetermined coding and modulation schemes, then the MS in the power saving mode can still receive the paging broadcast message even if no DCD/UCD message is received.

However, if the predetermined coding and modulation schemes are not used, the MS in the power saving mode does not receive a DCD/UCD message, and the BS changes (or updates) the coding and modulation schemes, the MS has to terminate the power saving mode since the MS is unable to decode the paging broadcast message. Alternatively, if the MS belongs to the same paging group but moves to a cell using different coding and modulation schemes, the MS has to terminate the power saving mode since the MS cannot decode the paging broadcast message. Alternatively, if the MS in the power saving mode does not receive any DCD/UCD messages, the re-entry to the network by the MS can take additional time since the MS has to receive the DCD/UCD message in order to receive the current coding and modulation schemes. As such, it seems necessary and practical for the MS in the power saving mode to be able to receive the DCD/UCD messages.

If the MS is configured to receive the DCD/UCD messages while in the power saving mode, the MS in the power saving mode can decode the downlink frame during a specified cycle. Furthermore, if the DCD/UCD status information (or values) are updated or changed during a Paging Unavailable Interval or if the MS has moved to another cell within the same paging group, the MS has to continuously receive and decode all subsequent downlink frames until the new DCD/UCD message with updated or changed status information is received. Here, the Paging Unavailable Interval is an interval or a period in which the MS does not receive and decode any downlink frames in order to conserve power. Moreover, as discussed above, the DCD/UCD message contains a Configuration Change Counter which is independently managed by each BS. For example, a first BS and a second BS belong to the same paging group. However, since the Configuration Change Counters independent of each other BS, the Counter of the first BS could be indicating 2 while the Counter of the second BS could be indicating 5. In addition, since the transmission cycle of the DCD/UCD message can be long (e.g., up to 10 seconds per cycle), the power consumption of the MS in the power saving mode can be significant.

Table 12 is an example of a paging broadcast message (i.e., MOB-PAG-ADV).

The paging broadcast message of Table 12 is different from the paging broadcast message of Table 5 in that the paging broadcast message of Table 12 includes a DCD/UCD Transmission Indication to determine whether transmission of the DCD/UCD message is scheduled during the Paging Unavailable Interval.

If the DCD/UCD Transmission Indication is set at '1,' a DCD/UCD Transmission Offset can be provided in a form of TLV in the paging broadcast message, as shown in Table 13.

TABLE 13

| Name | Type | Length | Value |
| --- | --- | --- | --- |
| DCD/UCD Transmission offset | TBD | 16 bits | This value may be included in MOB_PAG-ADV message when DCD Transmission Indication in the message is set to 1, and indicates the number of frames left for the next transmission of DCD message. |
| UCD Transmission offset | TBD | 16 bits | This value may be included in MOB_PAG-ADV message when UCD Transmission Indication in the message is set to 1, and indicates the number of frames left for the next transmission of UCD message. |

The DCD/UCD Transmission Indication of the paging broadcasts message of Table 12 and the DCD/UCD Transmission Offset of Table 13 can be in a form of a common downlink notification information element (i.e., Common_DL_Notification_IE) DL-MAP message as provided in Table 14. The common downlink notification information element can be included in a DL-MAP IE which is transmitted during the paging cycle. The DCD/UCD transmission offset bitmap is used to identify whether the offset is for the DCD or UCD.

TABLE 12

| Syntax | Size | Notes |
| --- | --- | --- |
| MOB_PAG-ADV_Message_Format( ){ | | |
| Management Message Type =?? | 8 bits | |
| Num_Paging Group IDs | 8 bits | Number of Paging Group IDs in this message |
| For(i=0; i<Num_Paging_Group_IDs; i++){ | | |
| Paging Group ID | 8 bits | |
| } | | |
| For(j=0; j<Num_MACs; j++){ | | |
| MSS MAC Address hash | 24 bits | |
| Action Code | 2 bits | Paging action instruction to MSS<br>00=No Action Required<br>01=Perform Ranging to establish location and acknowledge message<br>10=Enter Network<br>11=reserved |
| Reserved | 6 bits | |
| } | | |
| DCD Transmission Indicator | 1 bit | Indicates whether DCD message is included in the next Paging Unavailable Interval or not.<br>0=Not included<br>1=Included |
| DCD Transmission Indicator | 1 bit | Indicates whether UCD message is included in the next Paging Unavailable Interval or not.<br>0=Not included<br>1=Included |
| TLV Encoded Information | variable | TLV Specific |
| Reserved | | Padding bits to ensure octet aligned. |
| } | | |

Table 14 is an example of a common downlink notification DL-MAP message.

TABLE 14

| Syntax | Size | Notes |
|---|---|---|
| Common_DL_Notification_IE( ){ | | |
| Extended UIUC | 4 bits | |
| Length | 4 bits | Length in Bytes |
| DCD Transmission Indication | 1 bit | Indicates if DCD message is included in the next Paging Unavailable Interval or not. 0=Not included 1=Included |
| UCD Transmission Indication | 1 bit | Indicates if UCD message is included in the next Paging Unavailable Interval or not. 0=Not included 1=Included |
| DCD/UCD Transmission offset bitmap | 2 bits | This bitmap indicates; 00: No DCD/UCD offset is included. 01: DCD offset is included. 10: UCD offset is included. 11: DCD/UCD offsets are included. |
| reserved | 4 bits | Padding for byte alignment |
| DCD Transmission offset | 16 bits | This value may be included when DCD Transmission Indication set to 1, and indicates the number of frames left for the next transmission of DCD message. |
| UCD Transmission offset | 16 bits | This value may be included when UCD Transmission Indication set to 1, and indicates the number of frames left for the next transmission of UCD message. |
| } | | |

Figure 2:
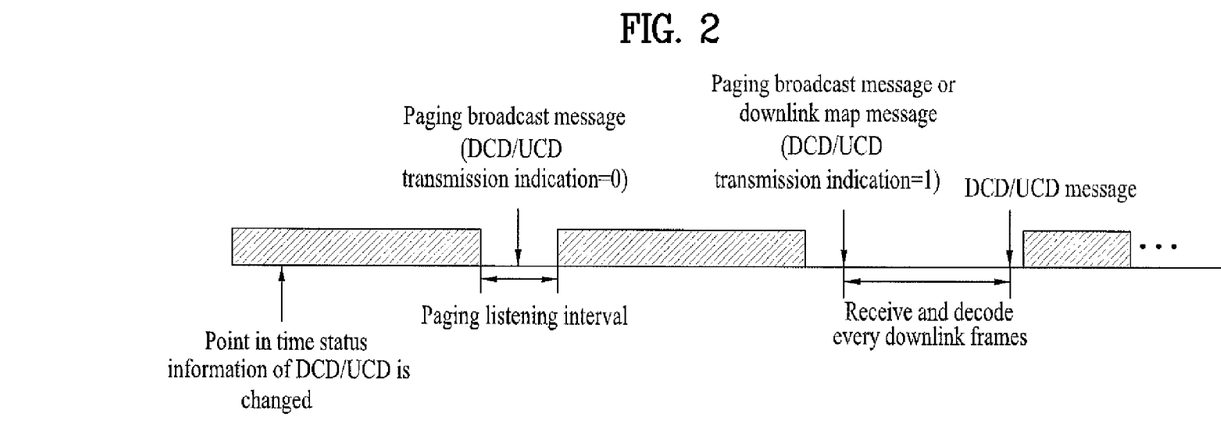
FIG. 2 illustrates an example of a transmission operation of a paging broadcast message or a common downlink notification DL-MAP IE.

FIG. 2 illustrates an example of a transmission operation of a paging broadcast message of Table 12 or a common downlink notification DL-MAP IE of Table 14. Referring to FIG. 2, the MS that is in the power saving mode identifies a change in the Configuration Change Counter included in the DCD/UCD message from the paging broadcast message received during the paging listening interval. Once the change is identified, the MS that is in the power saving mode has to obtain the DCD/UCD transmission indication parameters of the paging broadcast message which is received during the paging listening interval.

If the DCD/UCD transmission identification parameter is '0,' the MS knows that no DCD/UCD message transmitted during the next paging unavailable interval. Then the MS maintains normal power saving mode instead of waiting to receive the UCD/DCD message until the next paging listening interval.

On the contrary, the DCD/UCD transmission identification parameter set to '1' signifies that the DCD/UCD message is to be transmitted during the next paging unavailable interval. As such, the MS does not return to paging unavailable interval even after expiration of the listening interval until the MS receives the DCD/UCD message. In other words, the MS stays awake (maintains listening interval) until the DCD/UCD message is received. Upon receipt, the MS returns to the paging unavailable interval.

Figure 3:
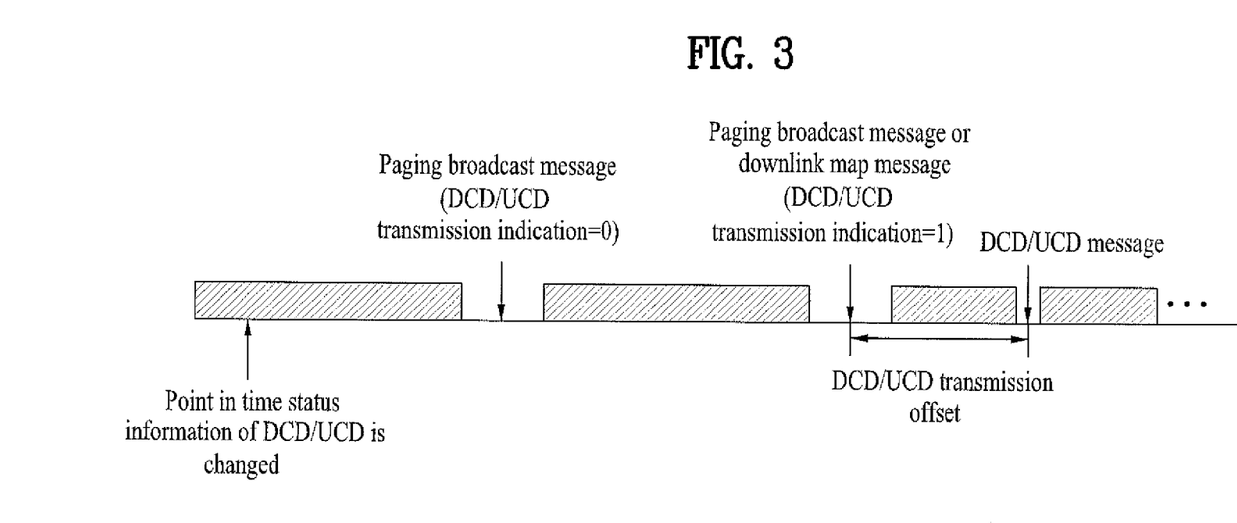
FIG. 3 is a diagram illustrating an example of an operation of a DCD/UCD transmission offset.

FIG. 3 is a diagram illustrating an example of an operation of a DCD/UCD transmission offset of Tables 13 and 14. In FIG. 3, the paging broadcast message can indicate an exact time (or frame) of when the DCD/UCD message is to be included in the transmission of the paging broadcast message. Therefore, the corresponding mobile stations can receive the DCD/UCD messages during the paging unavailable interval.

As another embodiment of the present invention, a DCD/UCD transmission offset can be used, instead of the DCD/UCD transmission indication to indicate whether the DCD/UCD message is transmitted during the paging unavailable interval. Here, the DCD/UCD transmission indication of Table 12 is removed or not used in the paging broadcast message. However, if the situation calls for the BS to transmit a DCD/UCD message during the paging unavailable interval, the DCD/UCD transmission offset TLV parameter can be included in the paging broadcast message, and the MS stays awake or enter paging unavailable interval until the paging broadcast message containing the DCD/UCD message is received, even after expiration of the listening interval. Alternatively, if the BS does not transmit the DCD/UCD message during the next paging unavailable interval, the DCD/UCD transmission offset TLV parameter is not included in the paging broadcast message. After the MS receives this paging broadcast message absent the DCD/UCD transmission offset TLV parameter and recognizes that the DCD/UCD message is not expected to be transmitted during the next paging unavailable interval. Therefore, the MS maintains normal power saving operation mode without staying awake.

Figure 4:
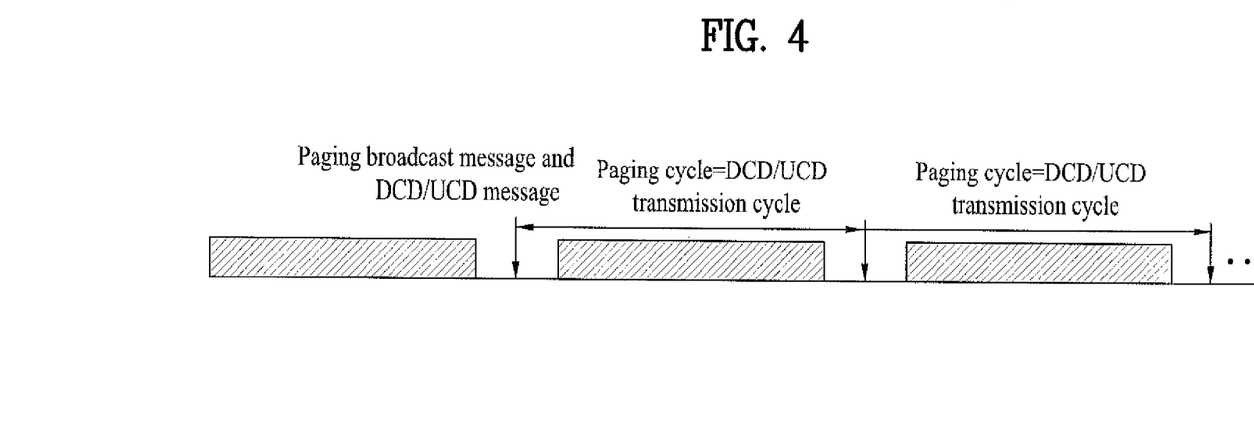
FIG. 4 illustrates is a diagram illustrating an example of a paging cycle synchronized to a DCD/UCD transmission cycle.

FIG. 4 is a diagram illustrating an example of a paging cycle synchronized to a DCD/UCD transmission cycle. As illustrated in FIG. 4, if the paging cycle of the power saving mode and the DCD/UCD message transmission cycle (i.e., DCD/UCD interval) are synchronized, all mobile stations in the paging listening interval of the power saving mode can receive the DCD/UCD messages during every paging listening interval. As such, the features of the embodiments of the present invention can be realized without the proposed operations presented in the embodiments of the present invention.

Figure 5:
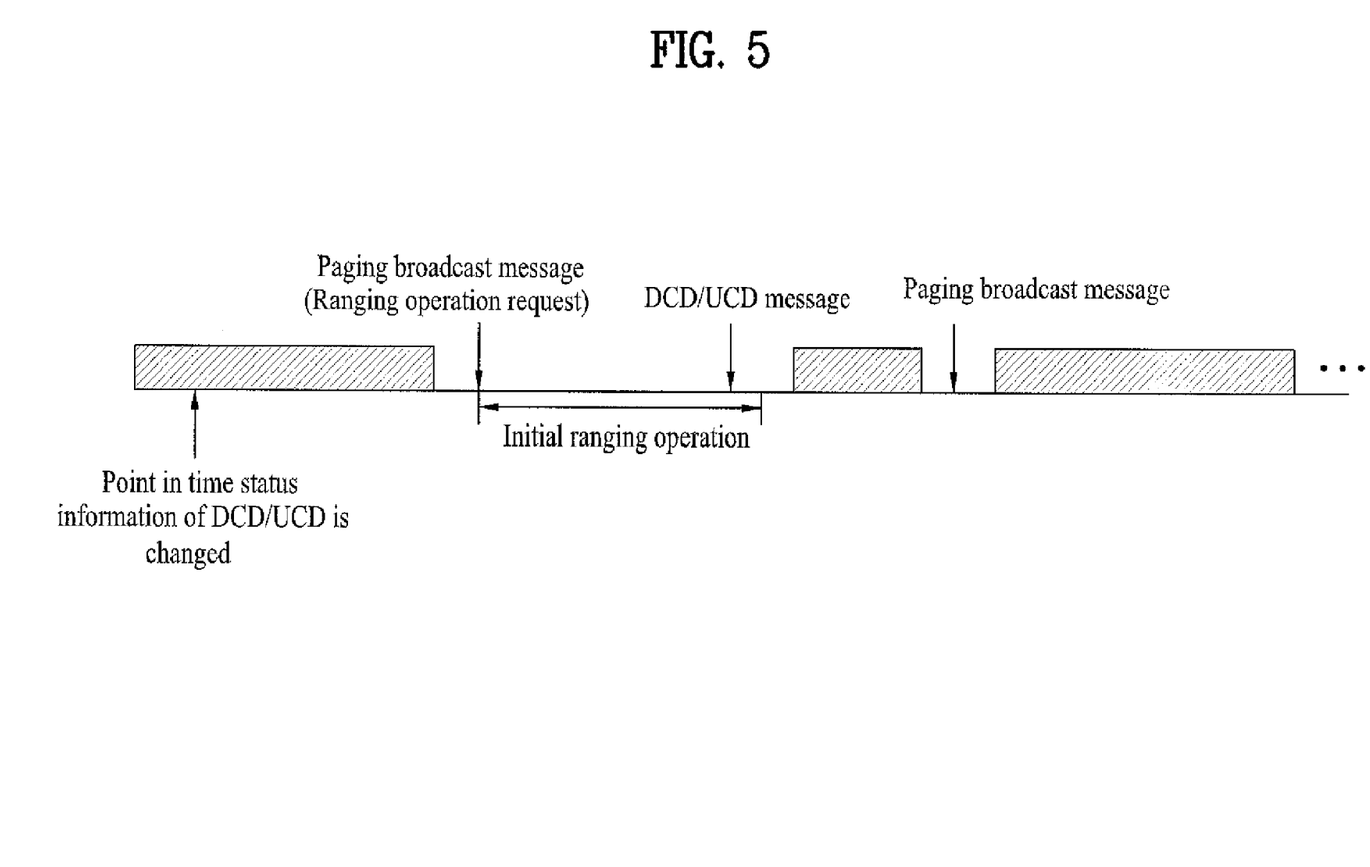
FIG. 5 is a diagram illustrating an example of an initial ranging operation by the MS according to coding scheme and modulation schemes changes in the BS.

FIG. 5 is a diagram illustrating an example of an initial ranging operation by the MS according to coding scheme and modulation schemes changes in the BS. First, to perform initial ranging operation, the DCD/UCD message has to be received by the MS. Thereafter, if the MS is directed to perform initial ranging operation, then the BS can transmit the DCD/UCD message to the MS that is in the power saving mode.

After the MS receives the ranging request message via the paging broadcast message, the MS performs following ranging operation. First, the MS receives the DCD/UCD message, followed by transmitting a ranging request (i.e., RNG-REQ) message, and thereafter receives a ranging response (i.e., RNG-RSP) message. After the ranging response message is received, the MS maintains the power saving mode. That is, if the MS receives and successfully decodes the DCD message and the UCD message and also receives the ranging response message, then the MS enters the paging unavailable interval to maintain the power saving mode.

Figure 6:
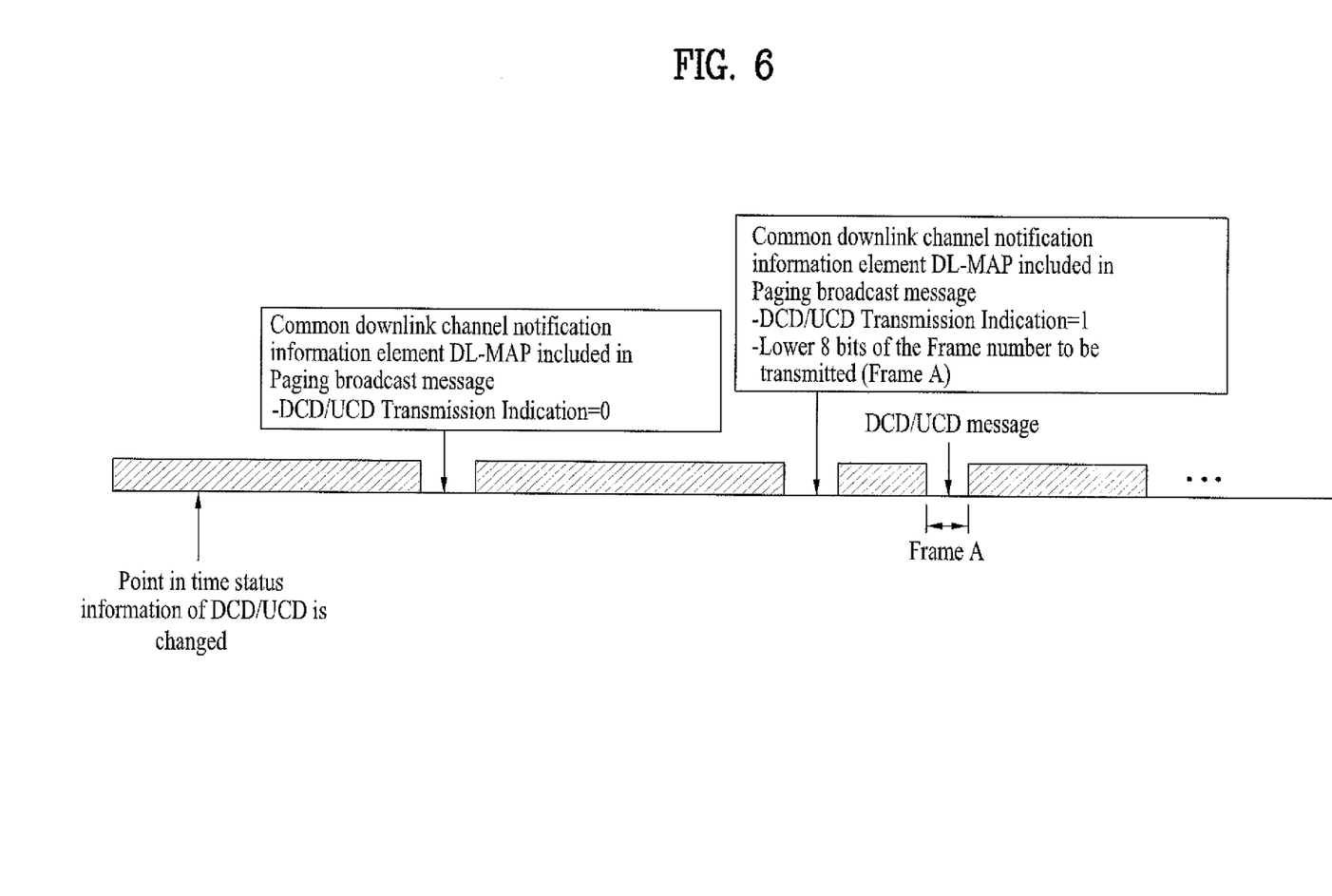
FIG. 6 is diagram illustrating an example of an operation using a frame number instead of a DCD/UCD transmission offset.

FIG. 6 is diagram illustrating an example of an operation using a frame number instead of the DCD/UCD transmission offset of Table 14. If the DCD/UCD transmission offset is used, the transmission offset has to be 16 bits considering a 16-bit maximum paging cycle of the power saving mode and a 10-second maximum DCD/UCD transmission cycle (e.g., 2000 frames where 1 frame=5 milliseconds). As for using the frame number, even if lower 8 bits are used, a frame to transmit the DCD/UCD can be indicated, thus able to decrease the size of the transmission message.

If the frame number is used instead of the DCD/UCD transmission offset, information listed in Table 15 can be additionally included to the paging broadcast message of Table 5 in a TLV format. Table 15 is an example of using a frame number in a TLV format in the paging broadcast message.

TABLE 15

| Name | Type | Length | Value |
| --- | --- | --- | --- |
| DCD/UCD Transmission frame | TBD | 8 bits | This value may be included in MOB_PAG-ADV message when DCD Transmission Indication in the message is set to 1, and indicates the least significant eight bits of the frame number of the next DCD transmission. |
| UCD Transmission frame | TBD | 8 bits | This value may be included in MOB_PAG-ADV message when UCD Transmission Indication in the message is set to 1, indicates the least significant eight bits of the frame number of the next UCD transmission. |

As described above, if the frame number is used instead of the DCD/UCD transmission offset, Table 16 illustrates another example of the common downlink notification (i.e., Common_DL_Notification_IE) DL-MAP IE to the example of Table 14.

TABLE 16

| Syntax | Size | Notes |
| --- | --- | --- |
| Common_DL_Notification_IE( ){ | | |
| Extended UIUC | 4 bits | |
| Length | 4 bits | Length of Bytes |
| DCD Transmission Indication | 1 bit | Indicates if DCD message is included in the next Paging Unavailable Interval or not. 0=Not included 1=Included |
| UCD Transmission Indication | 1 bit | Indicates if UCD message is included in the next Paging Unavailable Interval or not. 0=Not included 1=Included |
| DCD/UCD Transmission offset bitmap | 2 bits | This bitmap indicates; 00: No DCD/UCD offset is included. 01: DCD offset is included. 10: UCD offset is included. 11: DCD/UCD offsets are included. |
| reserved | 4 bits | Padding for byte alignment |
| DCD Transmission frame | 8 bits | This value may be included when DCD Transmission Indication in the message is set to 1, and indicates the least significant eight bits of the frame number of the next DCD transmission. |
| UCD Transmission frame | 8 bits | This value may be included when UCD Transmission Indication in the message is set to 1, indicates the least significant eight bits of the frame number of the next UCD transmission. |
| } | | |

Table 17 is an example of a Broadcasts Control Pointer IE included in the DL-MAP message if the frame number is used instead of the DCD/UCD transmission offset.

TABLE 17

| Syntax | Size | Notes |
| --- | --- | --- |
| Broadcast Control Pointer IE( ){ | | |
| Extended UIUC | 4 bits | 0x0A |
| Length | 4 bits | Length of Bytes |
| DCD_UCD Configuration | 4 bits | A composite configuration |

TABLE 17-continued

| Syntax | Size | Notes |
|---|---|---|
| Change Counter | | change counter incremented for each change in either DCD or UCD. |
| DCD_UCD Transmission Frame | 8 bits | The least significant eight bits of the frame number of the next DCD and/or UCD transmission |
| reserved | 4 bits | Shall be set to zero |
| } | | |

If a DCD_UCD Configuration Change Counter setting or parameter of the Broadcast Control Pointer IE of Table 17 is different from a DCD_UCD Configuration Change Counter setting or parameter stored in the MS, the MS receives and decodes the DCD/UCD message transmitted from the BS even after the MS has entered the paging unavailable interval. Here, the DCD/UCD message can be received by synchronizing the downlink frame with the transmission frame indicated in the Broadcast Control Pointer IE. That is, the MS awakes up or exits the paging unavailable interval during the frame. After the UCD/DCD messages are received, the MS returns to or enters the paging unavailable interval for maintaining the power saving mode.

However, if the MS fails to successfully decode the DCD/UCD message and if the BS does not transmit the DCD message or the UCD message at the specified transmission frame, the MS has to receive and decode all subsequent downlink frames to receive the DCD message or the UCD message with updated or changed status information or parameters. After the UCD/DCD messages are received, the MS returns to or enters the paging unavailable interval for maintaining the power saving mode.

As illustrated in FIG. 6, if the DCD/UCD message is scheduled to be transmitted during the next paging unavailable interval (e.g., at frame A), the BS can transmit information which includes that the message is to be transmitted via either the paging broadcast message, the DCD/UCD transmission indication of the common downlink notification DL-MAP IE, or the DCD/UCD transmission offset bitmap during the next paging unavailable interval.

Furthermore, the BS can indicate the lower 8 bits of the frame number, through which actual transmission is to take place, using the DCD transmission frame and the UCD transmission frame. Using this scheme, the MS can receive the DCD/UCD message transmitted to the corresponding frame even during the paging unavailable interval.

As indicated in Table 14 and Table 16, the DCD transmission indication, the UCD transmission indication, and the DCD/UCD transmission offset bitmap has a length of 1 bit, 1 bit, and 2 bits, respectively. Here, information contained in the DCD transmission indication, the UCD transmission indication, and the DCD/UCD transmission offset bitmap can be represented by using a flag, which has a length of 2 bits.

Table 18 is an example illustrating a flag.

TABLE 18

| DCD/UCD transmission indication flag | 2 bits | For each bit location, a value of indicates that DCD and UCD transmission is scheduled during next Paging Unavailable Interval. Bit 0: DCD transmission during next Paging Unavailable Interval. |
|---|---|---|

TABLE 18-continued

| | | UCD transmission is scheduled during next Paging Unavailable Interval. Bit 0: DCD transmission during next Paging Unavailable Interval. Bit 1: UCD transmission during next Paging Unavailable Interval. |
|---|---|---|

As shown in Table 18, a flag can be used to indicate whether the DCD/UCD is scheduled during the paging unavailable interval. For example, if the flag value or parameter is '00,' this indicates that there is no DCD/UCD transmission scheduled during the next paging unavailable interval. If the parameter of the flag is '01,' this indicates that only the DCD is scheduled for transmission. Moreover, if the flag parameter is '10,' this indicates that only the UCD is scheduled for transmission. Lastly, if the flag parameter is '11,' then this indicates that both the DCD and the UCD is scheduled for transmission.

Figure 7:
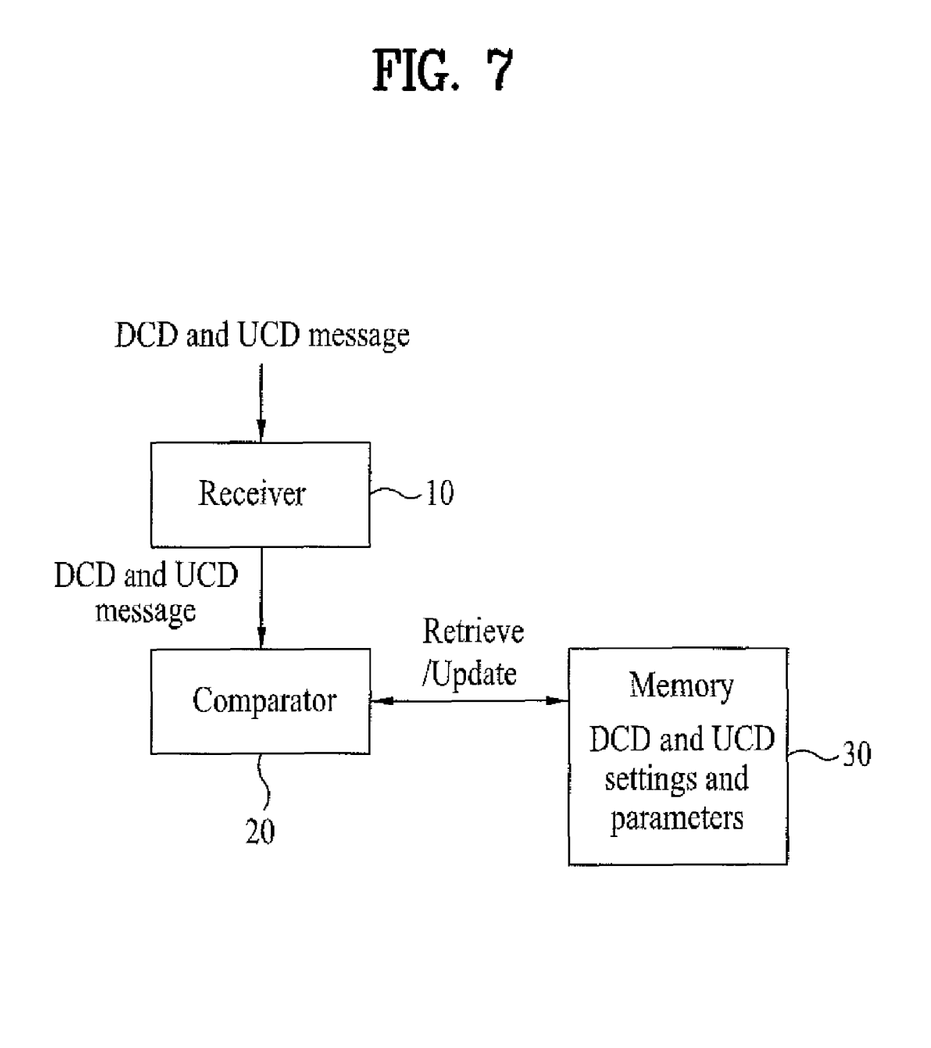
FIG. 7 is a diagram illustrating an example of an apparatus in a power saving mode which updates channel information.

In another embodiment of the present invention, an operation of updating channel information can be performed by an apparatus in a power saving mode. FIG. 7 is an example of an apparatus in a power saving mode which is used to update channel information. In FIG. 7, the apparatus includes a receiver 10 which receives status information, such as the DCD message and/or the UCD message, of a first channel descriptor and transmission frame information which includes when the first channel descriptor is scheduled to be transmitted. The apparatus further includes a comparator 20 which is used to compare status information of the first channel descriptor with status information of a second channel descriptor. Here, the second channel descriptor is stored in a memory 30 of the MS. Furthermore, the receiver 10 also receives the first channel descriptor according to the transmission frame information if the compared status information from the comparator 20 are different.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for updating channel information of a mobile station which is in an idle mode, the method comprising:
    receiving an information element (IE) including a channel descriptor configuration change counter and a transmission frame field indicating a frame in which a channel descriptor is transmitted; and
    receiving the channel descriptor by awakening at the frame indicated by the transmission frame field even if the mobile station is scheduled to be in a paging unavailable interval when the channel descriptor configuration change counter has changed since the mobile station last decoded the IE; and
    decoding the channel descriptor,
    wherein upon a decoding failure, the mobile station continues decoding subsequently received frames until the channel descriptor is successfully decoded.

2. The method according to claim 1, further comprising:
    maintaining the idle mode before receiving the channel descriptor.

3. The method according to claim 1, further comprising:

receiving indication information indicating whether a channel descriptor transmission is scheduled to transmit the channel descriptor during a next paging unavailable interval.

4. The method according to claim 3, wherein the paging unavailable interval is an interval during which the mobile station in the idle mode cannot communicate with a base station.

5. The method according to claim 1, wherein the information element (IE) is received during a paging interval.

6. The method according to claim 5, wherein the paging interval is an interval during which the mobile station in the idle mode communicates with a base station.

7. The method according to claim 1, wherein the channel descriptor is either an uplink channel descriptor (UCD) or a downlink channel descriptor (DCD).

8. The method according to claim 7, wherein either the uplink channel descriptor (UCD) or the downlink channel descriptor (DCD) is a broadcast message.

9. The method according to claim 1, wherein the information element (IE) is a broadcast control pointer information element.

10. The method according to claim 1, wherein the transmission frame field is 8-bits in size and indicates when a next channel descriptor is transmitted.

11. The method according to claim 1, wherein the channel descriptor is a broadcast message.

12. The method according to claim 1, wherein the transmission frame field indicates a frame number.

13. The method according to claim 1, wherein upon successful completion of decoding of the channel descriptor, the mobile station immediately returns to the idle mode.

14. A mobile station for updating channel information in an idle mode, the mobile station comprising:

a receiver for:

receiving an information element (IE) including a channel descriptor configuration change counter and a transmission frame field indicating a frame in which a channel descriptor is transmitted; and receiving the channel descriptor by awakening at the frame indicated by the transmission frame field even if the mobile station is scheduled to be in a paging unavailable interval when the channel descriptor configuration change counter has changed since the mobile station last decoded the IE, wherein the mobile station decodes the channel descriptor, and wherein upon a decoding failure, the mobile station continues decoding subsequently received frames until the channel descriptor is successfully decoded.

15. The mobile station according to claim 14, wherein the receiver further receives indication information indicating whether a channel descriptor transmission is scheduled to transmit the channel descriptor during a next paging unavailable interval.

16. The mobile station according to claim 15, wherein the paging unavailable interval is an interval during which the mobile station in the idle mode cannot communicate with a base station.

17. The mobile station according to claim 14, wherein the information element is received during a paging interval.

18. The mobile station according to claim 17, wherein the paging interval is an interval during which the mobile station in the idle mode communicates with a base station.

19. The mobile station according to claim 14, wherein the information element (IE) is a broadcast control pointer information element.

20. The mobile station according to claim 14, wherein the transmission frame field is 8-bits in size and indicates when a next channel descriptor is transmitted.

* * * * *